Nov. 1, 1938.  W. H. HORSTER  2,134,919
AIR DUCT
Filed May 4, 1937  2 Sheets-Sheet 1

Inventor
W. H. Horster
By Watson E. Coleman
Attorney

Nov. 1, 1938.  W. H. HORSTER  2,134,919
AIR DUCT
Filed May 4, 1937   2 Sheets-Sheet 2
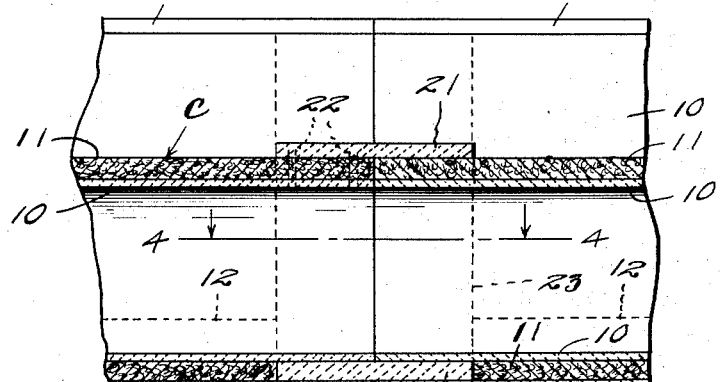
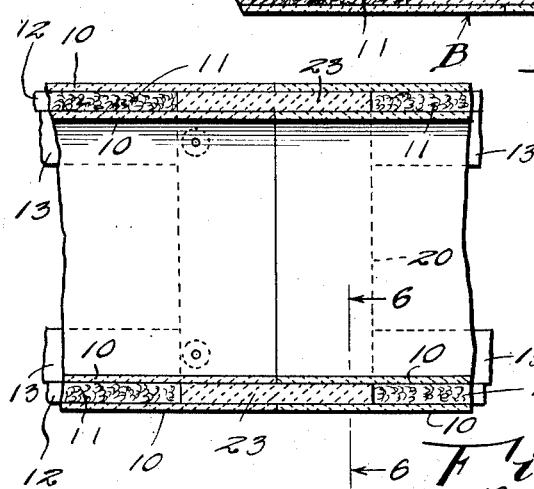
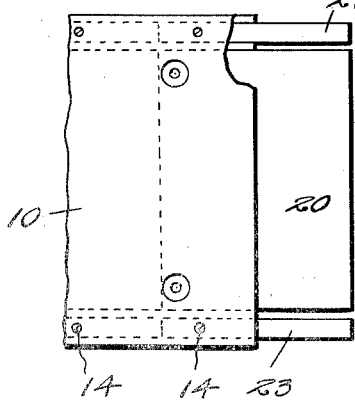
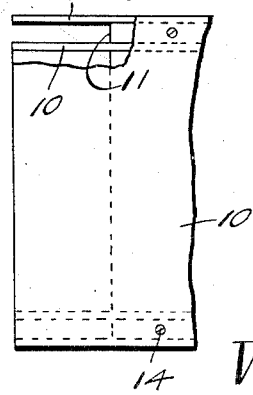
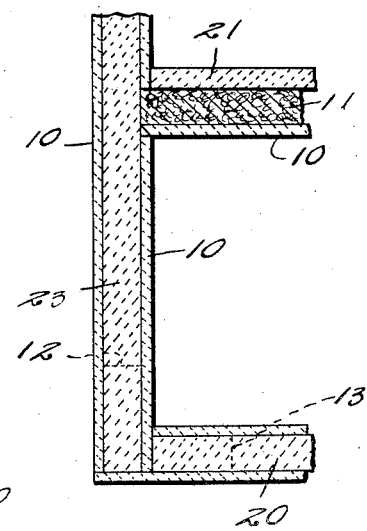
Inventor
W. H. Horster
By Watson E. Coleman
Attorney Patented Nov. 1, 1938

2,134,919

UNITED STATES PATENT OFFICE 2,134,919

AIR DUCT

William H. Horster, Tulsa, Okla.

Application May 4, 1937, Serial No. 140,749

4 Claims. (Cl. 138—64)

This invention relates to conduits or ducts and particularly to a conduit designed for use as a ventilating duct such as is used for air conditioning work. Such ducts today are ordinarily formed of sheet metal over which metal lathing is placed, plaster then being applied to the metal lathing. This construction has the objection that it is not entirely fire-proof and particularly that these metal conduits are not sound-proof and sound is readily transmitted from one portion of a building to another where such conduits are used. This is not only generally objectionable but particularly objectionable where air conditioning is used in radio control rooms, moving picture stages where sound is used and under like circumstances.

One object of my invention is to provide a laminated fire-proof and sound-proof duct which is acceptable to fire underwriters and which may be, if necessary, installed in an already erected building.

Another object is to provide a duct which may be readily disposed beneath a ceiling beam and be fully insulated therefrom and which will have the appearance of a fully plastered beam forming part of the ceiling itself and not as an excrescence on the ceiling or wall.

A further object is to provide a duct which is not only fire-proof but sound-proof so that sounds will not be carried by the duct from one part of a building to another.

My invention is illustrated in the accompanying drawings wherein:—

Fig. 3 is a vertical sectional view through two adjoining sections of the conduit.

Fig. 4 is a horizontal section on the line 4—4 of Fig. 3.

Fig. 5 is a top plan view of two adjoining sections of conduit, the sections being partly broken away.

Fig. 6 is a section on the line 6—6 of Fig. 4.

Figure 1:
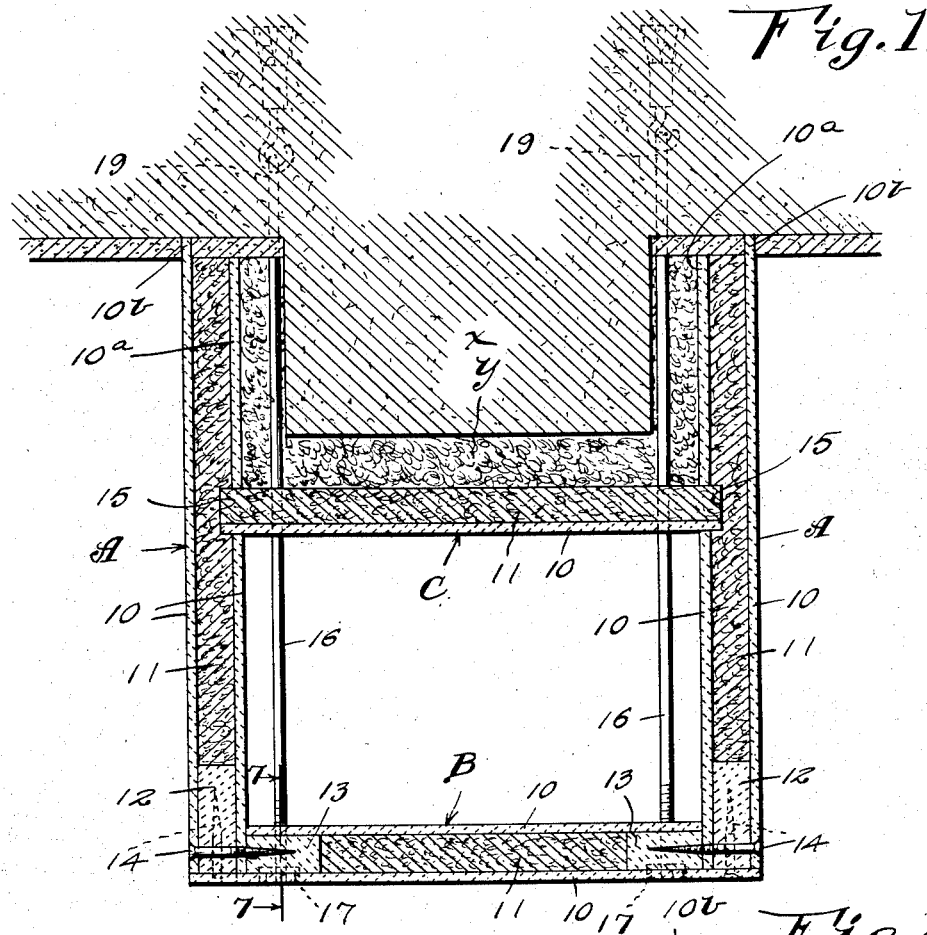
Fig. 1 is a vertical sectional view through an air conduit constructed in accordance with my invention.

Referring to these drawings, it will be seen that my duct or conduit is constructed in sections and before stating how these sections are formed and supported, I will describe the construction of one section. Each section of the duct consists of four slabs; that is, two lateral slabs A, a bottom slab B and a slab C, which forms the top wall of the duct. The space defined by these four slabs constitutes the conduit proper through which conditioned air will pass.

Each slab consists of outer layers or thicknesses 10 of highly compressed fire-proof composition with an intermediate filling of highly compressed sound-proof material to which the outer layers are cemented. It is to be understood that "boards" of this character are on the market and that these "boards" are no part of my invention save that they are utilized by me in a novel manner to form this duct. The slabs A, B and C are relatively light, fire-proof and sound-proof and at the same time extremely rigid and strong.

In order to provide for joining the slabs A and B to each other, there is inserted between the layers 10 and in place of the intermediate core 11, at the lower edges of the slabs A, the longitudinally extending blocks or strips 12 which might be made of wood but are preferably of very densely compacted fire-proof composition. These strips 12 may extend entirely along the slab in the form of an inserted strip or be disposed in the form of separate blocks at intervals therein. Like strips or blocks 13 are disposed between the layers 10 of the slabs B at the lateral edges of the slabs. The slabs A overlap the edges of slab B (or the slab B may overlap the edges of slabs A). The outermost layer 10 of the slab B, for instance, extends across the lower edges of the slabs A, as shown. Screws 14 pass through the slab A and into the slab B and like screws 14 extend up through the overlapping portions of the outermost layer 10 into the edges of the strips 12. Thus both sets of screws are set into hard, firm strips of fire-proof material in which the screws will hold. Thus these screws rigidly connect the slabs A to the slab B.

The slabs A of each section of the conduit are recessed at 15 to receive the side margins of the slab C. This slab does not need a fire-proof layer 10 on its upper face; that is, the face directed away from the air conduit or passage, though it will be understood that such a layer may be provided. The layer of sound-proof material 11 and one layer of fire-proof material 10, however, is ordinarily all that is necessary.

At its upper end the outside layer 10 is extended upward above the core 11 and the inner layer 10$^a$ so that this upstanding portion 10$^b$ may be embedded in the plaster of the ceiling while the edges of the layers 10$^a$ and 11 abut against the face of the plaster. This eliminates expansion and contraction at the joints.

Figures 2, 7:
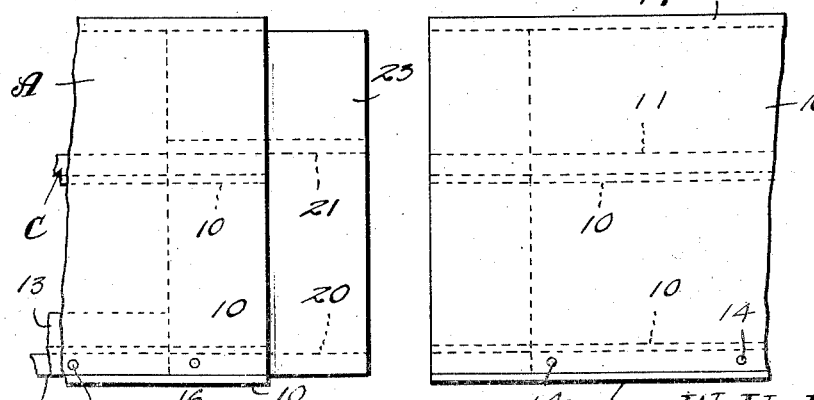
Fig. 2 is a side elevation of two adjacent sections of the air conduit shown in Fig. 1.
Fig. 7 is a fragmentary section on the line 7—7 of Fig. 1.

Each section of the conduit will be supported by hangers 16 which pass through apertures in the bottom slab B and through the slab C and particularly through the strips or blocks 13 of the slab B. These hangers are provided at their lower ends with nuts 17 and washers 18 inserted in countersunk recesses, as shown in Fig. 7. The threads of these hangers may have threaded engagement with the slab B. The upper ends of the hangers are formed with eyes 19 or with hooks or other means whereby they may be engaged with suitable expansion bolts disposed within the material of the ceiling.

The side walls A are carried up above the slab or transverse wall C so as to fit over a ceiling beam X and so that the space between the bottom of the beam, the wall A and the wall C, may be filled with loose fireproof material Y.

I have described so far the construction of one section of the conduit, which conduit is formed of a series of sections, each section having any desired length, and I will now describe how these sections are connected to each other so as to make the entire conduit rigid and so that the joints between the sections shall be formed of overlapping layers to thus form a "break joint" between the sections.

In Figs. 3 to 5, I have illustrated two adjacent sections of conduit constructed in accordance with the structure heretofore described. Where the two sections join each other, the opposed horizontal slabs B, as shown in Figs. 3 and 5, are spliced to each other by an inserted cleat 20 of hard and dense highly compressed fire-proof material which extends into the spaces formed by cutting out or omitting the core 11, so that the layers 10—10 embrace the inserted cleat and abut against each other.

The two sections of wall C abut against each other, as shown in Fig. 3, but attached to the upper face of one wall C is a cleat 21 of hard and dense fire-proof fibrous material held in place by screws 22 and extending over the next adjacent wall C and, if desired, attached by screws thereto.

The side walls A are also spliced, as shown in Figs. 4 and 5, by an inserted cleat 23 of the same character as cleat 20 and held in place as by screws. It will thus be seen that all the three outer walls are spliced to each other by these internal cleats of highly compressed rigid hard fire-proof fibrous material. Of course, these sections may be of any desired length depending entirely upon the building in which the conduit is disposed.

It will be seen that I have provided a conduit structure which is light and yet very rigid and which is not only fire-proof but sound-proof as well, and that a conduit constructed in accordance with my invention will not be unpleasantly conspicuous but will have the appearance of an integral portion of the building structure. It is obvious that when the conduit is not to extend beneath a beam, the side walls A need not extend upward as far above the walls C as is shown in Fig. 1.

Particular attention is called to the use of the inserts 12 and 13. These are formed of very compact finely fibrous highly compressed fireproof material and thus a secure hold is provided for the screws 14, which will entirely prevent these screws from pulling out. The cleats 20, 21 and 23 are all preferably formed of this hard highly compressed fire-proof material such as is used for the inserts 12 and 13.

The conduit which I have described, in addition to having the advantageous qualities heretofore referred to is particularly applicable for buildings already constructed in which an air conditioning system is being placed or added, as this conduit may be readily put in place with a minimum of labor and a minimum of damage to the walls and ceilings of the building. Obviously the exact form of the conduit as illustrated will be varied in accordance with the different requirements in different buildings.

What is claimed is:—

1. An air conduit including two parallel lateral walls and a bottom wall, each of said walls consisting of a slab of composite material having a medial core of highly compressed sound-proof material, and outer and inner layers of highly compressed fibrous fire-proof material, the edges of the bottom wall abutting against the lower margins of the side walls and the outer layer of fire-proof material of the bottom wall overlapping the edge faces of the lateral walls, the adjacent margins of the bottom wall and the side walls having the core of sound-proof material omitted therefrom and the spaces filled with strips of highly compressed fire-proof fibrous material, screws passing through the lower margin of the outer wall and into the said strips of the bottom wall, and screws passing through the outer layer of fire-proof material of the bottom wall and up into the strips of the side walls.

2. An air conduit including two parallel lateral walls and a bottom wall, each of said walls consisting of a slab of composite material having a medial core of highly compressed sound-proof material, and outer and inner layers of highly compressed fibrous fire-proof material, the edges of the bottom wall abutting against the lower margins of the side walls and the outer layer of fire-proof material of the bottom wall overlapping the edge faces of the lateral walls, the adjacent margins of the bottom wall and the side walls having the core of sound-proof material omitted therefrom and the spaces filled with strips of highly compressed fire-proof fibrous material, screws passing through the lower margins of the side walls and into the said strips of the bottom wall, screws passing through the outer layer of fire-proof material of the bottom wall and up into the strips of the side walls, and hangers having their lower ends screw-threaded and extending through the strips of the lower wall and provided with nuts engaging the lower wall, the upper ends of the hangers being formed for engagement with a ceiling.

3. An air conduit formed of alined sections, each section having two parallel side walls and two parallel transverse walls, the walls defining an air space, the side walls and the outermost transverse wall being formed of a medial core of fibrous compressed sound-proof material and integrally joined outer and inner layers of highly compressed fibrous fire-proof material, the other transverse wall being formed of a slab having an inner layer confronting the air conduit of highly compressed fibrous fire-proof material and an outer layer of compressed sound-proof material, the abutting ends of the side walls and of the outer transverse walls of the two sections having the inner sound-proof core omitted and the space thus left being filled by a cleat of highly compressed fibrous fire-proof material, the second named transverse walls of the two sections being abutted, and a cleat of highly compressed fibrous fire-proof material attached to and overlapping the adjacent portions of said second-named walls.

4. An air conduit, including two parallel walls and an outer transverse wall, the lateral margins of one wall overlapping the edge face of an adjacent wall, each of said walls comprising a medial core of sound-proof material and outer layers of integrally conjoined highly compressed fibrous fire-proof material, the adjacent portions of the transverse wall and the parallel walls having the cores of sound-proof material omitted therefrom and each space thus formed being filled with a strip of highly compressed fire-proof material, screws extending at right angles to each other and passing through said walls and engaging the walls with each other and an inner transverse wall, the parallel walls being recessed to receive the ends of the inner transverse wall, the inner wall being composed of a layer of highly compressed fibrous fire-proof material and a layer of sound-proof material integrally connected therewith, and supporting means extending through the ends of the lower transverse wall and through the strips of highly compressed fire-proof material inserted into the ends of said wall and through the upper transverse wall.

WILLIAM H. HORSTER.